United States Patent
Yajima

(10) Patent No.: US 6,226,496 B1
(45) Date of Patent: May 1, 2001

(54) ANTENNA MALFUNCTION DETECTING SYSTEM

(75) Inventor: Yuji Yajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/106,256

(22) Filed: Jun. 29, 1998

(30) Foreign Application Priority Data

Jun. 30, 1997 (JP) .................................................... 9-174325

(51) Int. Cl.$^7$ ...................................................... H04B 1/10
(52) U.S. Cl. ............................................ 455/63; 333/17.3
(58) Field of Search ................................ 455/413, 63, 68, 455/69, 70, 26.1, 404, 521, 434, 515, 422, 435, 561, 127; 333/17.3, 33, 253; 343/703

(56) References Cited

U.S. PATENT DOCUMENTS

| | | | | |
|---|---|---|---|---|
| 4,584,650 | * | 4/1986 | Kozuch | 364/481 |
| 4,799,063 | * | 1/1989 | Hill | 343/703 |
| 5,079,507 | * | 1/1992 | Ishida et al. | 324/645 |
| 5,408,690 | * | 4/1995 | Ishikawa et al. | 455/115 |
| 5,471,146 | * | 11/1995 | Krayeski et al. | 324/637 |
| 5,939,953 | * | 8/1999 | Yogo et al. | 333/17.3 |

FOREIGN PATENT DOCUMENTS

| | | |
|---|---|---|
| 5-136747 | 6/1993 | (JP) . |
| 6-296168 | 10/1994 | (JP) . |

* cited by examiner

Primary Examiner—Vivian Chang
Assistant Examiner—N. Mehrpour
(74) Attorney, Agent, or Firm—McGuireWoods, LLP

(57) ABSTRACT

An antenna malfunction detecting system, which comprises a plurality of detectors for detecting voltage values of a standing wave, caused by a reflected wave occurring at a trouble point of an antenna system, at different detecting points, is realized for obtaining precise detection result of malfunctioning. Each wave detector for detecting voltage values of the standing wave is connected to each output of a distributor, connected to an output of a circulator which is inserted between a transmission final-stage amplifier and an antenna connector terminal, and one of then is connected via a $\lambda/4$ strip line to detect voltage value of the standing wave in a different position of line equivalently. Thereby, an amplitude value of the standing wave caused by the antenna malfunction can be precisely detected.

18 Claims, 5 Drawing Sheets

ANTENNA MALFUNCTION DETECTING SYSTEM

BACKGROUND OF THE INVENTION

1. Field of the Invention

The present invention relates to a radio transmitting/receiving device, particularly to an antenna malfunction detecting system for detecting an abnormality in an antenna system which is connected to a radio transmitting/receiving device.

2. Description of the Related Art

A conventional antenna malfunction detecting system disclosed in, for example, the patent application laid-open No. Hei 6-296168, as shown in FIG. 5, relates to a radio transmitting/receiving device of an automobile telephone system. To detect an abnormality in an antenna, a circulator 17 is inserted between an output of a final-stage amplifier 16 and an antenna 3. When there is an abnormality in the antenna, a reflected wave of an output signal of the final-stage amplifier 16 from the antenna is detected by a rectification circuit 21. When the reflected wave is large as a result of comparison with a preset reference voltage (REF), the final-stage amplifier 16 is controlled by a control circuit 23. Further, an alarm is given to a display circuit for indicating an occurrence of abnormality to a maintenance personnel.

Also, another conventional antenna malfunction detecting system is disclosed in the patent application laid-open No. Hei 5-136747, as shown in FIG. 6. In this technology, a directional coupler 2 is inserted between a radio transmitter 1 and an antenna 3. A traveling wave power from the radio transmitter 1 and a reflected wave power from the antenna 3 are detected and compared in a comparison circuit. Thereby, an increase of a reflected wave is detected, and an alarm is issued.

In the aforementioned conventional antenna malfunction detecting system for detecting a reflected wave, when there is a trouble in the antenna, the reflected wave occurring at a trouble point is detected. However, since a standing wave is generated between a reflection point and a wave source, the amplitude of the reflected wave varies depending on a position of a wave detector, and it might becomes maximum or minimum in accordance with the position of the wave detector for detecting the reflected wave. Therefore, the reflected wave cannot be detected precisely in some case. In this case, it is wrongly judged whether the antenna is normal or abnormal.

SUMMARY OF THE INVENTION

An object of the present invention is to provide an antenna malfunction detecting system, which comprises a plurality of detectors for detecting voltage values of a standing wave, caused by a reflected wave occurring at a trouble point of an antenna system, at different detecting points, for obtaining precise detection result of malfunctioning.

An antenna malfunction detecting system according to the present invention comprises the following elements;

- a circulator which is provided between a transmission final-stage amplifier and an antenna system for outputting a transmission wave having been input from the transmission final-stage amplifier to a first output to the antenna system, and outputting a reflecting wave generated at a trouble point of the antenna system and coming back from the first output to a second output;
- a distributor being connected to the second output of the circulator for distributing the reflected wave to a plurality of outputs;
- a plurality of detectors each connected to each output of the distributor respectively for detecting voltage values of a standing wave, caused by said reflected wave, at different detecting points each other; and
- control circuit which receives each detection result of the plurality of detectors for judging abnormality of the antenna system by processing the received detection results.

Line length difference of each line between the distributor to each detector is $½n$ (where, n is positive integer) of a wavelength of radio signal being detected.

BRIEF DESCRIPTION OF THE DRAWINGS

The present invention will be described in further detail with reference to the accompanying drawings, in which.

DETAILED DESCRIPTION OF THE PREFERRED EMBODIMENTS

Embodiments of the present invention will be described in detail with reference to the drawings.

Figure 1:
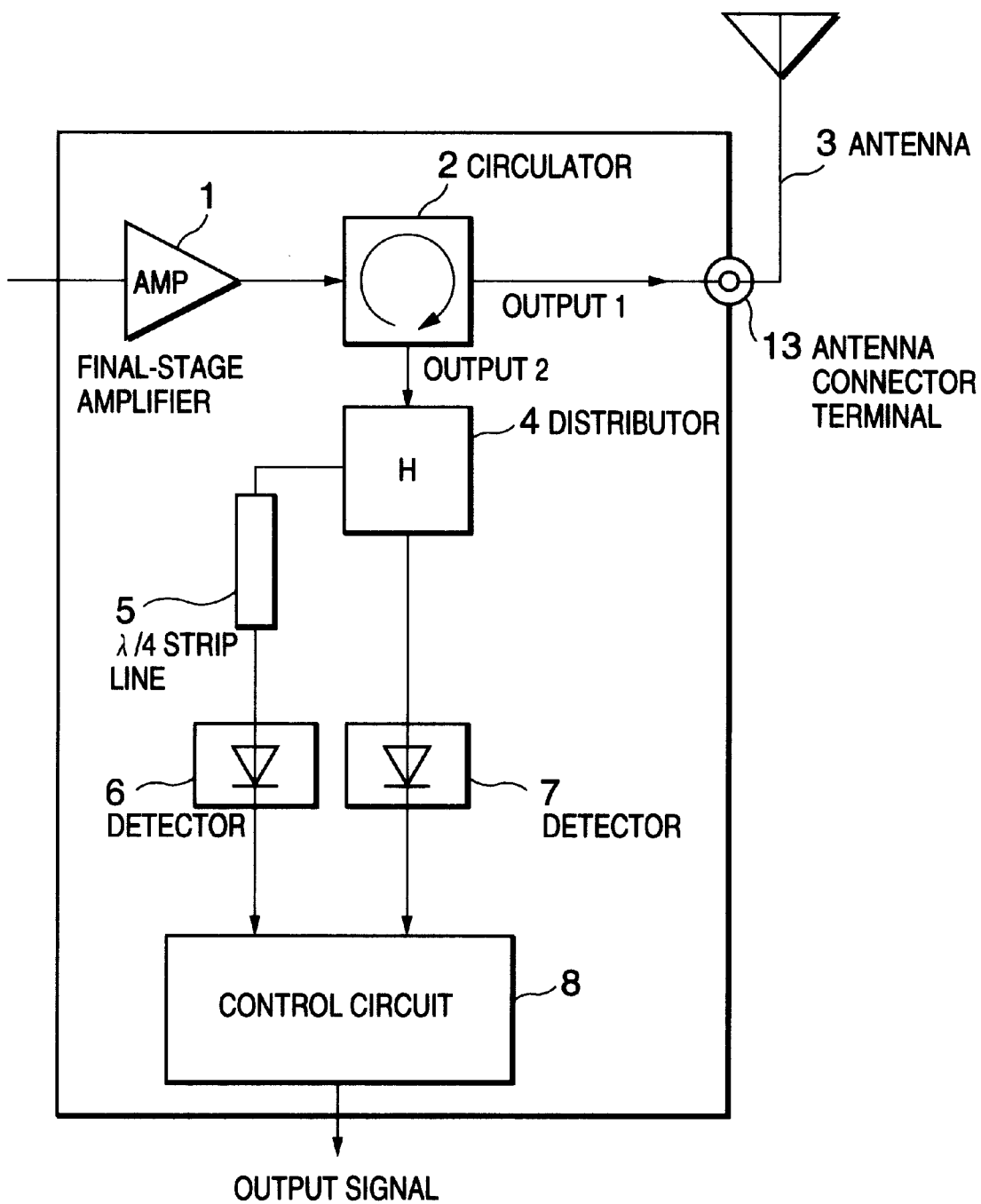
FIG. 1 is a block diagram of a radio signal transmission section showing a first embodiment of an antenna malfunction detecting system according to the present invention.

FIG. 1 is a block diagram showing an example in which an antenna malfunction detecting system of the present invention is applied to a radio signal transmission section of a radio communication device which uses a band of 1.9 GHz.

An output signal of a transmission final-stage amplifier 1 is transmitted from an output 1 of a circulator 2 via an antenna connector terminal 13 to an antenna 3. On the other hand, an output 2 of the circulator 2 is distributed into two by a distributor 4. One output is connected to a wave detector 7 and the other output is connected via a λ/4 strip line 5 to a wave detector 6. ("X" indicates a wavelength of a radio signal concerned. Additionally, the length of the strip line 5 may be ½, ⅛ or the like of the wavelength.) Then, outputs of the wave detectors 6 and 7 are transmitted to a control circuit 8, respectively.

Now considered is the case where there is a malfunction in the antenna 3 and the antenna connector terminal 13 is opened or short-circuited. At this time, a transmission wave is reflected at the antenna connector terminal 13, and a reflected wave is generated. The reflected wave is transmitted by the circulator 2 to the output 2 in such a manner that the reflected wave does not return to the amplifier 1. Here, if an impedance in a line between a reflection point (antenna connector terminal) and the wave detector 7 matches with an impedance (e.g., 50 ohms) of the antenna or the circuit, no standing wave occurs in the line. When the output of the circulator 2 is detected as it is, there will be no problem. However, since the antenna terminal is opened or short-circuited, the impedance is already higher or lower than the impedance of the circuit. The impedance of the circuit between the circulator 2 and the wave detector 7 is thus deviated from 50 ohms. Therefore, the output from the circulator 2 is reflected at the point of the wave detector 7. For this reason, there arise a wave returned after reflected by the antenna connector terminal 13 and a wave returned after again reflected by the wave detector 7. As a result, a standing wave occurs.

Figure 4A:
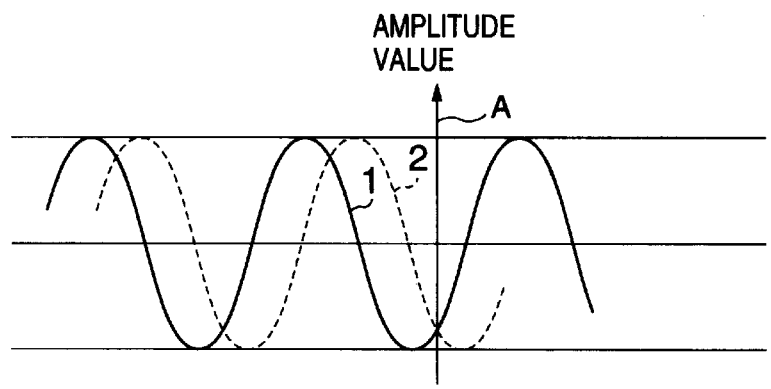
FIGS. 4(a) and 4(C) shows the condition when there are an incident wave 1 which is reflected at the antenna connector terminal 13 and a reflected wave 2 which is again reflected at the wave detector, then a standing wave occurred is detected at a detection position A as shown in FIGS. 4(B) and 4(D).
Figure 4B:
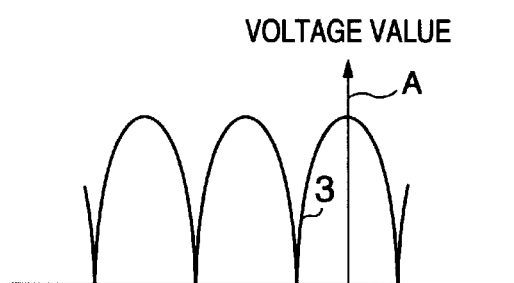
FIG. 4 is an explanatory view showing a condition in which a standing wave voltage generated by a reflected wave between an antenna connector terminal and a wave detector changes with positions of the wave detector.
Figure 4C:
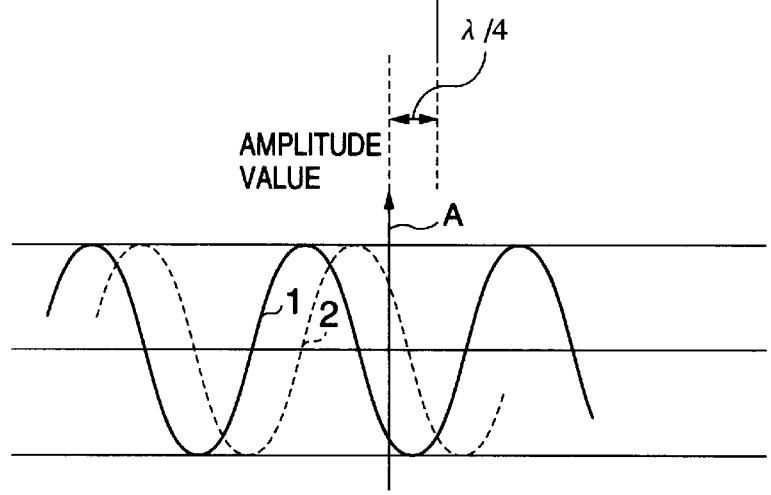
Figure 4D:
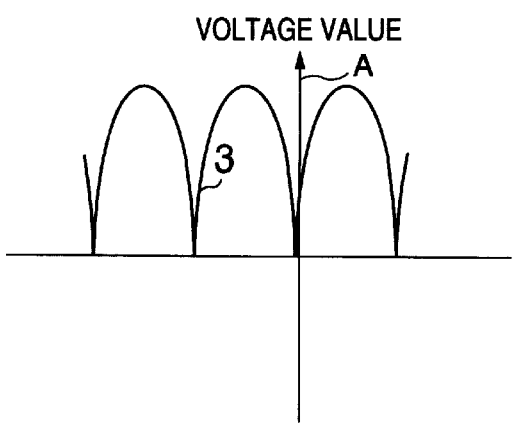
Figure 5:
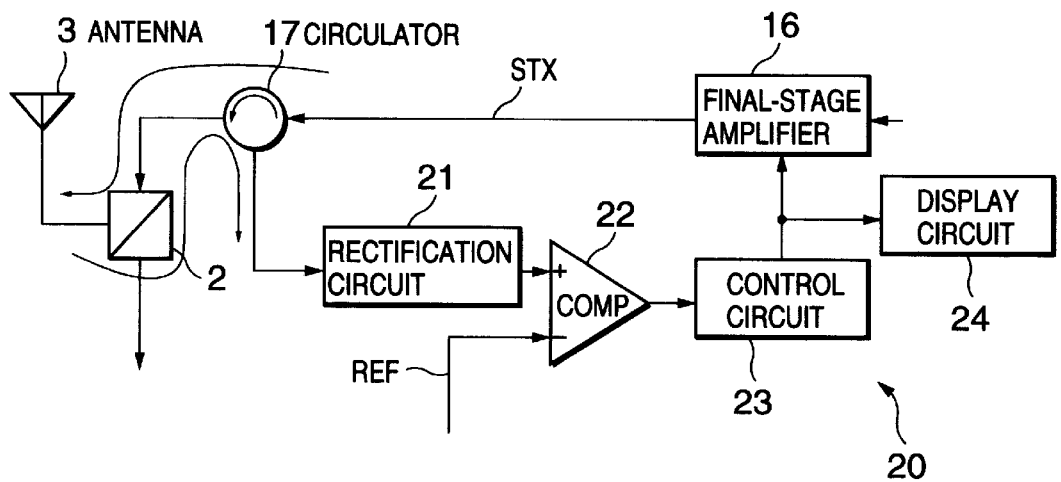
FIG. 5 is a block diagram of an antenna malfunction detecting system disclosed in the patent application laid-open No. Hei 6-296168.
Figure 6:
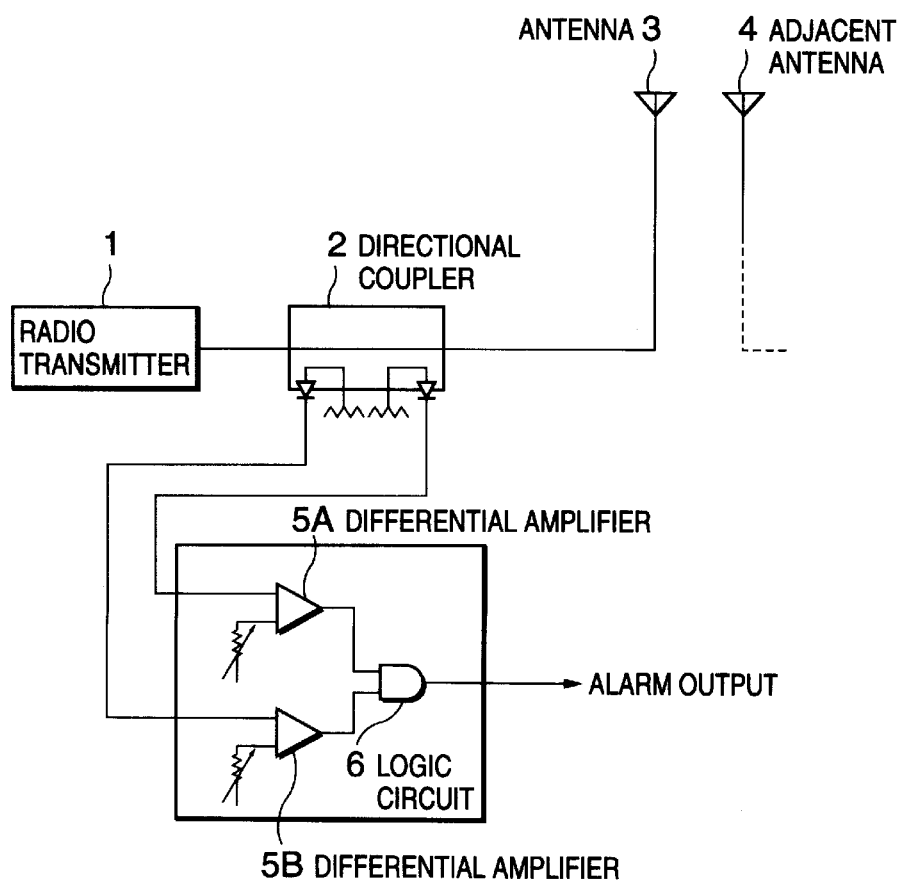
FIG. 6 is a block diagram of an antenna malfunction detecting system disclosed in the patent application laid-open No. Hei 5-136747.

The condition is shown in FIGS. 4(A)–4(D). When there are an incident wave 1 which is reflected at the antenna connector terminal 13 and a reflected wave 2 which is again reflected at the wave detector, then a standing wave occurred is detected at a detection position A as shown in FIGS. 4(B) and 4(D). When the standing wave is detected at the position shown in FIG. 4(B), a wave detection voltage is high, while at the wave detection position shown in FIG. 4(D), the wave detection voltage is low.

Then, the reflected wave from the antenna connector terminal of the transmitted wave is split into two, and detected in different positions relative to the antenna connector terminal (or the circulator 2). In either wave detection position, a high wave detection voltage is obtained. Specifically, the output from the circulator 2 is distributed into two outputs by the distributor 4. One output is detected by the wave detector 7 as it is. The wave detection result is transmitted to the control circuit 8. The other output is transmitted through the $\lambda/4$ strip line 5 and detected by the wave detector 6. The wave detection result is transmitted to the control circuit 8. In this constitution, for example, even when the low amplitude is detected at the wave detector 7 as shown in FIG. 4(D) because the detection position of the standing wave is the minimum position, the wave detection position differs in the wave detector 6 and the large amplitude is detected as shown in FIG. 4(B) because the detection position of the standing wave is the maximum position.

In the control circuit 8, by amplifying, adding and averaging the wave detection voltages from the wave detectors 6 and 7, an influence of a dispersion in reflected voltage can be avoided. In the control circuit 8, an analog signal is converted to a digital signal and digital processing may be performed. Alternatively, the control circuit may be constituted in an analog manner by using a comparator or the like.

Figure 2:
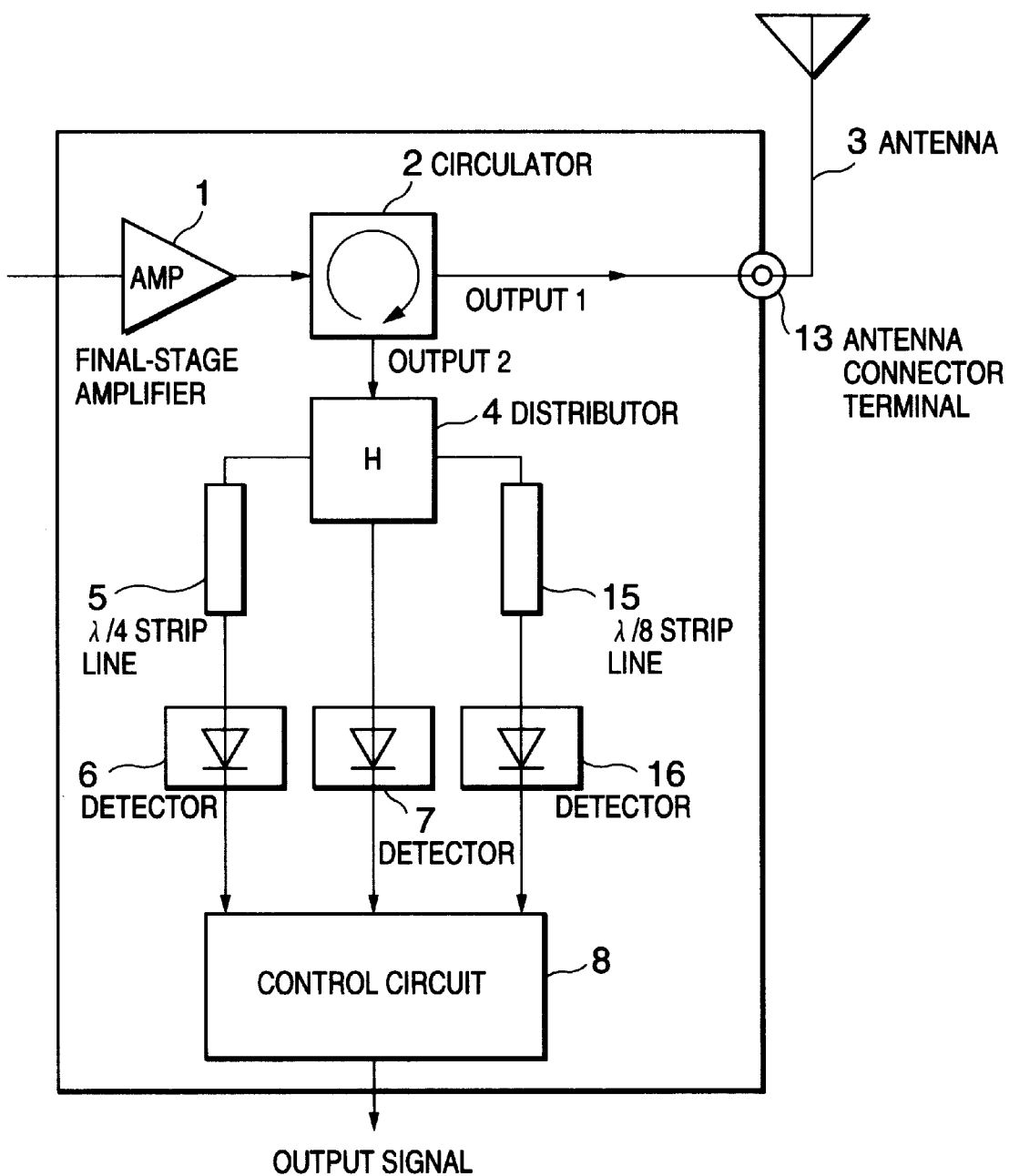
FIG. 2 is a block diagram of a radio signal transmission section showing a second embodiment of an antenna malfunction detecting system according to the present invention.

FIG. 2 is a block diagram of a radio signal transmission section showing a second embodiment of the present invention. In FIG. 2, an output 2 of a circulator 2 is distributed into three by a three-distributor 4. One output is transmitted to a wave detector 7. Another output is connected via a $\lambda/4$ strip line 5 while the distance from the distributor 4 to a wave detector 6 is made longer than the distance from the distributor 4 to the wave detector 7.

Further remaining output is connected via a $\lambda/8$ strip line 15 while the distance from the distributor 4 to a wave detector 16 is made longer than the distance from the distributor 4 to the wave detector 7. Additionally, the length of the strip line 5 or 15 is $\frac{1}{2}$, $\frac{1}{4}$, $\frac{1}{8}$ or the like of the wavelength. Further, the lengths of the strip lines 5 and 15 are different from each other.

Outputs of the wave detectors 6, 7 and 16 are transmitted to the control circuit 8, respectively. In this embodiment, by adding one more wave detection circuit, it means that the voltage values of the standing wave are detected at three different detection points, and as the result, more precise detection result is obtained.

Figure 3:
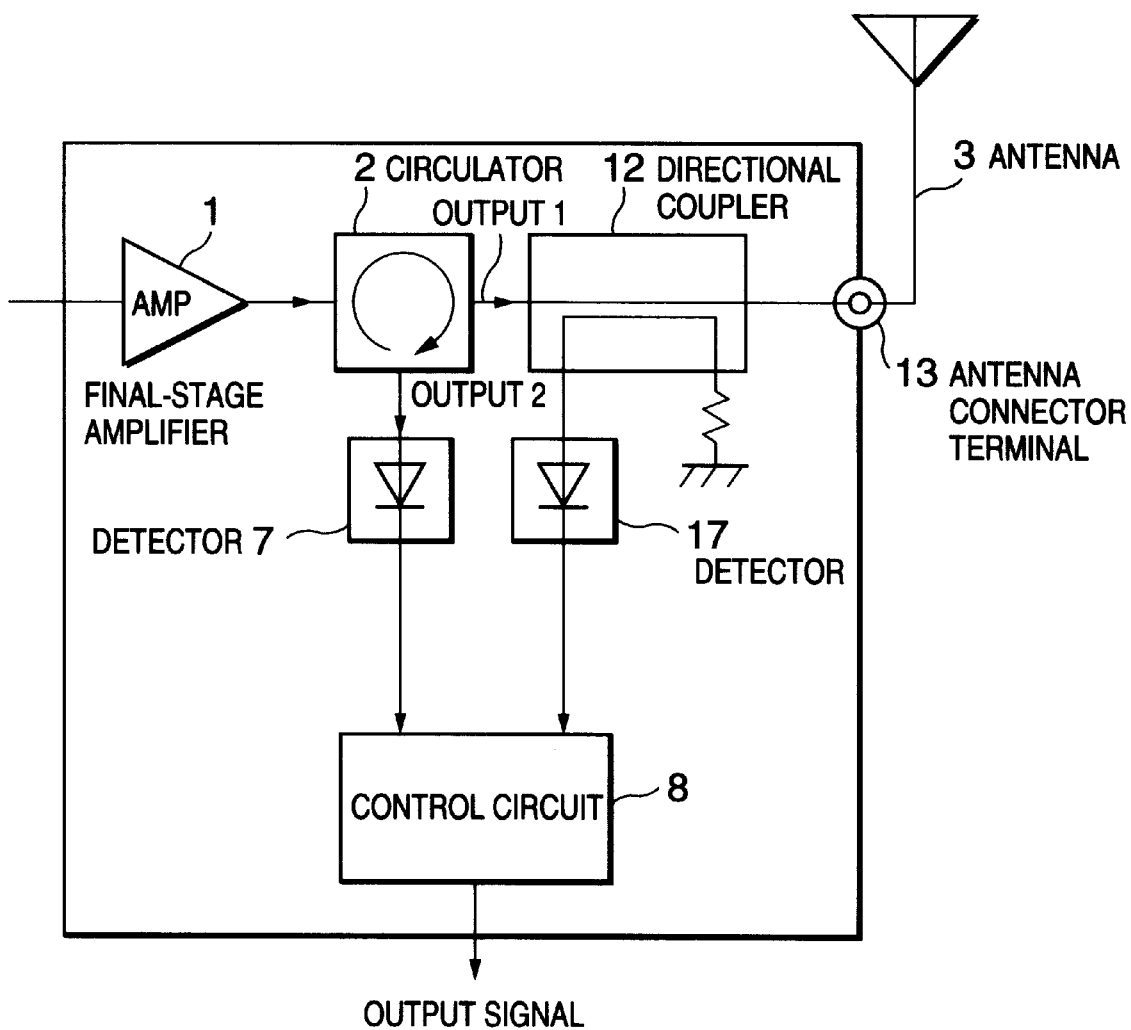
FIG. 3 is a block diagram of a radio signal transmission section showing a third embodiment of an antenna malfunction detecting system according to the present invention.

FIG. 3 is a block diagram of a radio signal transmission section showing a third embodiment of the present invention. In FIG. 3, an output of a transmission final-stage amplifier 1 is connected via a circulator 2 and a directional coupler 12 to an antenna connector terminal 13. An output 2 of the circulator 2 is connected to a wave detector 7. One output of the directional coupler 12 is terminated by a circuit impedance (terminating unit), and the other output is connected to a wave detection circuit 17.

The reflected wave branched output from the circulator or from the circulator and the directional coupler inserted between the transmission final-stage amplifier and the antenna terminal is detected by plural wave detectors which are placed in a predetermined relationship. By using plural outputs of wave detectors, irrespective of the occurrence of the standing wave, the abnormality in the antenna system can be advantageously detected precisely.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An antenna malfunction detecting system for detecting a standing wave caused by a reflected wave generated at a trouble point of an antenna system, said detecting system comprising;

distributing means being provided between a transmission final-stage amplifier and an antenna system for branching outputs of said reflected wave for detection;

a plurality of detectors connected to respective outputs of said distributing means by a different length of line, respectively, for detecting voltage value of said standing wave at different detection points at different respective distances from said antenna system; and a control circuit connected to said detectors for receiving output of each detector to judge abnormality of said antenna system by processing said detection results wherein said distributing means distributes said reflecting wave to two branches, and a difference of line length from said distributing means to each detector being $\frac{1}{2}^n$, n being positive integer, of a wavelength of a radio signal being detected.

2. An antenna malfunction detecting system for detecting a standing wave caused by a reflected wave generated at a trouble point of an antenna system, said detecting system comprising;

distributing means being provided between a transmission final-stage amplifier and an antenna system for branching outputs of said reflected wave for detection;

a plurality of detectors connected to respective outputs of said distributing means by a different length of line, respectively, for detecting voltage value of said standing wave at different detection points at different respective distances from said antenna system; and a control circuit connected to said detectors for receiving output of each detector to judge abnormality of said antenna system by processing said detection results wherein said distributing means distributes said reflecting wave to three branches, and a difference of respective line length from said distributing means to each detector being $½^n$, n being positive integer, of a wavelength of a radio signal being detected.

3. An antenna malfunction detecting system comprising;
a circulator provided between a transmission final-stage amplifier and an antenna system for outputting a transmission wave input from said transmission final stage amplifier to a first output to said antenna system, and outputting a reflecting wave generated at a trouble point of said antenna system and coming back from said first output to a second output;
a distributor connected to said second output of said circulator for distributing said reflected wave to a plurality of outputs;
a plurality of detectors each connected to a respective output of said distributor for detecting voltage values of a standing wave, caused by said reflected wave, at different detecting line length distances from said antenna system; and
a control circuit receiving detection results from said plurality of detectors for judging abnormality of said antenna system by processing said detection results wherein each difference of line length between respective detectors and said distributor being $½^n$, n being positive integer, of a wavelength of radio signal being detected.

4. An antenna malfunction detecting system as recited in claim 1, wherein said wave reflected by said trouble point is further reflected by said detector to form said standing wave.

5. An antenna malfunction detection system as recited in claim 1, wherein said different positions are different distances from said trouble point.

6. An antenna malfunction detection system as recited in claim 1, wherein said control circuit adds and averages outputs of said detectors.

7. An antenna malfunction detecting system as recited in claim 1, wherein said wave reflected by said trouble point is further reflected by said detector to form said standing wave.

8. An antenna malfunction detection system as recited in claim 1, wherein said different respective distances are different distances from said trouble point.

9. An antenna malfunction detection system as recited in claim 1, wherein said control circuit adds and averages outputs of said detectors.

10. An antenna malfunction detecting system as recited in claim 3, wherein said wave reflected by said trouble point is further reflected by said detector to form said standing wave.

11. An antenna malfunction detection system as recited in claim 3, wherein said different respective line length distances are different line length distances from said trouble point.

12. An antenna malfunction detection system as recited in claim 3, wherein said control circuit adds and averages outputs of said detectors.

13. An antenna malfunction detecting system as recited in claim 2, wherein said wave reflected by said trouble point is further reflected by said detector to form said standing wave.

14. An antenna malfunction detection system as recited in claim 2, wherein said different positions are different distances from said trouble point.

15. An antenna malfunction detection system as recited in claim 2, wherein said control circuit adds and averages outputs of said detectors.

16. An antenna malfunction detecting system as recited in claim 2, wherein said wave reflected by said trouble point is further reflected by said detector to form said standing wave.

17. An antenna malfunction detection system as recited in claim 2, wherein said different respective distances are different distances from said trouble point.

18. An antenna malfunction detection system as recited in claim 2, wherein said control circuit adds and averages outputs of said detectors.

* * * * *